United States Patent [19]

Wahlfeldt et al.

[11] 4,342,251
[45] Aug. 3, 1982

[54] ANTI-DETONATION POWDER SAFETY DEVICE

[75] Inventors: Richard W. Wahlfeldt, El Paso, Tex.; David R. Field, St. Marks, Fla.

[73] Assignee: Olin Corporation, Stamford, Conn.

[21] Appl. No.: 126,232

[22] Filed: Mar. 3, 1980

[51] Int. Cl.³ .................... C06B 21/00; F42B 33/00
[52] U.S. Cl. .................................... 86/1 R; 55/310; 55/385 C; 137/512.1
[58] Field of Search .............. 86/1 R; 55/310, 385 C; 137/461, 512.1

[56] References Cited

U.S. PATENT DOCUMENTS 3,621,871 11/1971 Zimmerle .......................... 55/310
3,730,049 5/1973 Andrew .............................. 86/1 R Primary Examiner—Paul R. Michl
Attorney, Agent, or Firm—Bruce E. Burdick; Paul J. Lerner

[57] ABSTRACT

A anti-detonation safety device for use in a bulk handling system transporting explosive powder. The device comprises spaced inlet and outlet members and, disposed therebetween, a plurality of interconnected planar panels defining a cruciform chamber, the wings of which each include a top panel, operable in response to an increase of the pressure in the chamber, to provide for venting the same.

14 Claims, 3 Drawing Figures

ANTI-DETONATION POWDER SAFETY DEVICE

BACKGROUND AND SUMMARY OF THE INVENTION

This invention concerns the prevention of detonation of a quantity of explosive powder, in a bulk handling system, which would otherwise result from deflagration of the powder within the system.

In the manufacture of explosive or incendiary devices, such as certain types of ammunition, and the like, large quantities of explosive material, such as smokeless powder and the like, must frequently be transferred from place to place.

Transport, and temporary storage, of such volumes of such material is, of course, dangerous since ignition thereof may result in detonation, with catastrophic results. This danger requires that the utmost precautions be taken, including the abolition of smoking, matches, lighters, and other devices which could cause ignition of the powder.

Notwithstanding such safety precautions, accidental powder ignition may still occur as a result of any of a number of causes which the most stringent safety precautions can minimize, but not eliminate.

This invention concerns the prevention of detonation of a quantity of explosive material being transported, or temporarily stored, even if deflagration thereof occurs. It is known that detonation of a confined mass of explosive powder will occur once heat and gas pressure, caused by combustion gases produced by the burning powder, become sufficient to cause the burning rate of the powder to reach a mass detonation rate, at which time all of the powder is substantially instantaneously consumed, causing an explosion. If the stored powder burns at a rate which is less than the mass detonation rate, no explosion will occur, and the powder will merely burn itself up. The safety drive of this invention provides for pressure relief of the burning powder, whereby the burning rate is prevented from increasing to the mass detonation rate.

The pressure relief is provided by means of a device disposed in a vertical powder transport system and comprising a chamber having a plurality of wall members operable in response to an increase in chamber pressure. Preferably, the chamber includes a central portion opening upwardly into a plurality of prismatic wing portions, the top wall member of each prism being raised in response to elevated chamber pressure so as to provide a means of escape for gases produced by powder combustion.

BRIEF DESCRIPTION OF THE DRAWING

The invention may be more clearly understood by reference to the specification, the claims and the drawing, wherein:

DESCRIPTION OF THE PREFERRED EMBODIMENT

Figure 1:
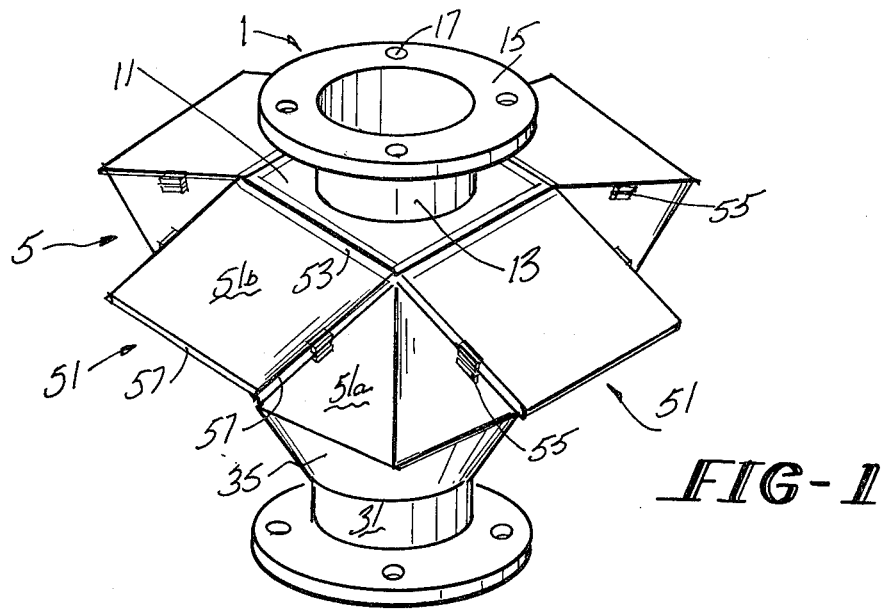
FIG. 1 is a perspective view of an embodiment of the present invention.
Figure 2:
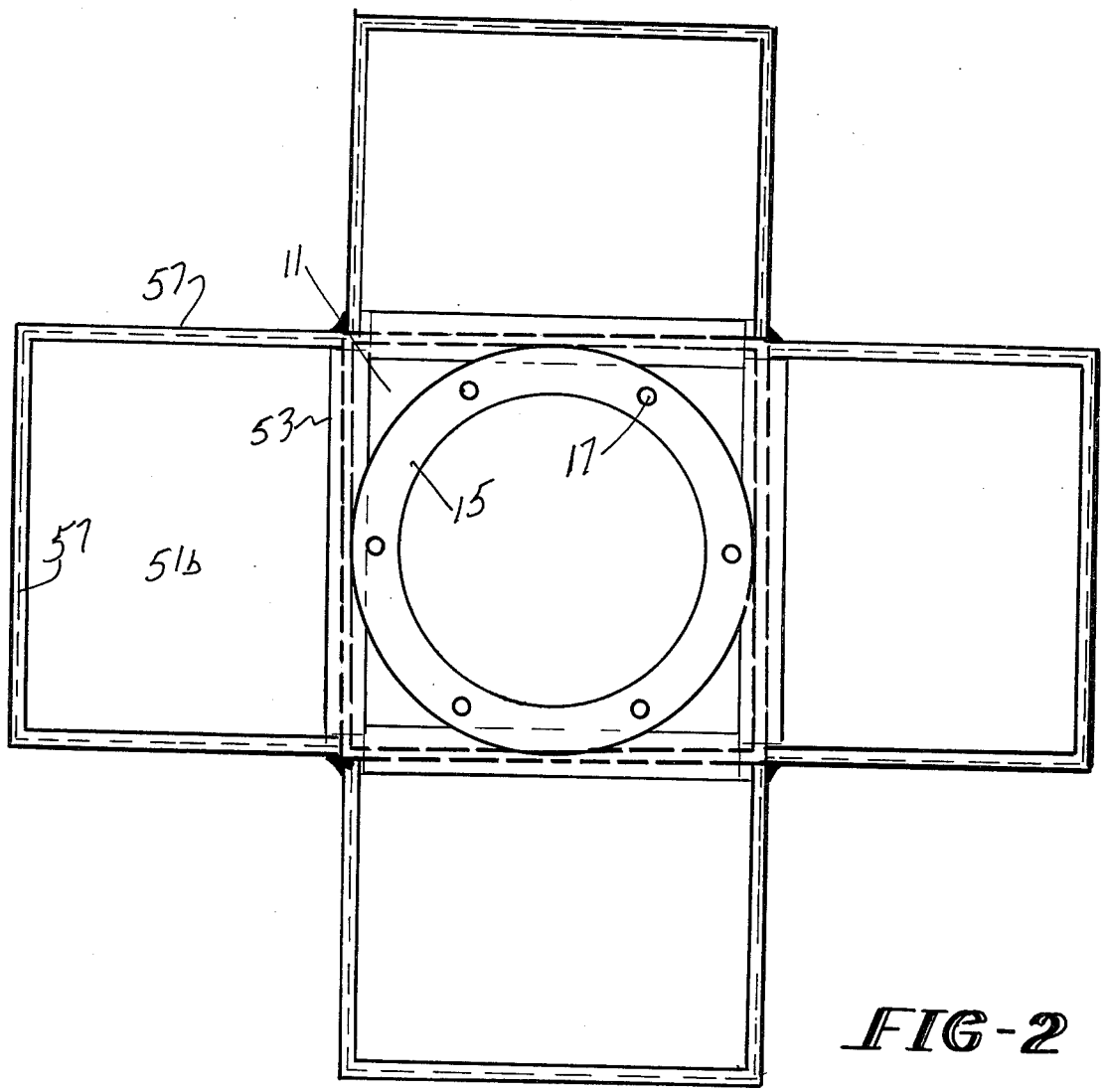
FIG. 2 is a top plane view of the device of FIG. 1.
Figure 3:
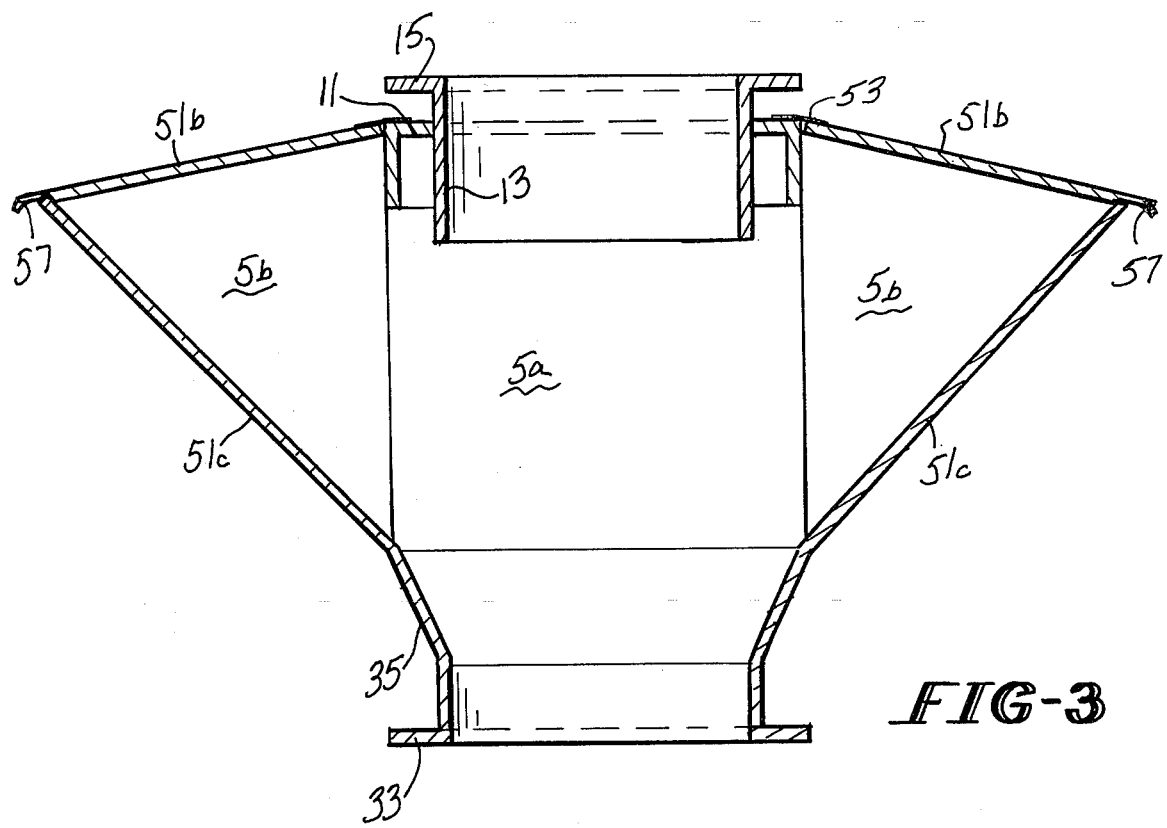
FIG. 3 is a cross-sectional view taken along line 3—3 of FIG. 2.

As best seen in FIG. 1, the pressure relief device of the present invention comprises concentric, spaced inlet and outlet members 1 and 3 respectively and a multilobed chamber 5 disposed therebetween.

The inlet member 1 comprises a square inlet plate 11 through which passes a cylindrical inlet body 13 terminating in an inlet flange 15. The inlet flange 15 is provided with a number of bolt holes 17 spaced for alignment with similar holes in a pipe flange in the powder transport system (not shown), the device being designed for suspension from the latter mentioned flange.

The chamber 5 comprises four symmetrically disposed box-like, open ended body members 51 serially interconnected, in side-to-side relation, so as to define, in conjunction with the inlet and outlet members 1 and 3, a central chamber 5a and four wing chambers 5b communicating therewith. The body members 51 are each formed of four planar panels: two opposed triangular side panels 51a and square top and bottom panels 51b and 51c respectively. The side panels 51a are disposed parallel to the longitudinal axis of the pressure relief device, while the bottom panel 51c, of each body member 51, is inclined, relative to the said longitudinal axis, to provide for free flow of powder passing through the device. Although the flow characteristics of the powder may vary, due to a variety of factors, it has been determined that the included angle between the bottom panel 51c and the longitudinal axis should be not more than 75° and preferably about 45°. Further, the inlet body 13 projects into the central chamber 5a, terminating below the plane defined by the lines of contact of corresponding top and bottom panels 51b and 51c, to prevent over-filling.

The top panels 51b are hingedly connected to the edges of the inlet plate 11, by strips of flexible tape 53, and are retained in contact with the corresponding side panels 51a and bottom panel 51c by means of magnetic latches 55. The latches 55 are adapted to open when the top panel 51b is subjected to an internal pressure of 2 p.s.i. The top panels 51b are of a size to provide at least 0.75 square feet of vent area per hundred pounds of powder in the handling system. If the pressure relief device is to be used outdoors, the top panel 51b may be provided with a downturned lip or flange 57, overlapping the side panels 51a and the bottom panel 51b, to keep rain from entering the chamber 5.

The outlet member 3 comprises a cylindrical outlet body 31, terminating in an outlet flange 33, and a funnel-like outlet connecting member 35, communicating between the bottom of the chamber 5 and the outlet body 31. The outlet flange 33 is provided with a number of bolt holes 37 spaced for alignment with similar holes in a pipe flange in the powder transport system (not shown).

It should, thus, be apparent that, in the event of ignition of powder within the chamber 5, or in the powder transport system communicating therewith, the top panels 51b will open, venting the chamber 5 to the atmosphere and preventing a pressure increase therein, whereby detonation is avoided.

Since many changes and variations of the disclosed embodiment of the invention may be made without departing from the invention concept, it is not intended to limit the invention otherwise than as required by the appended claims.

We claim:

1. A safety device for preventing detonation of a quantity of powder in a bulk handling system, said device comprising:
   an inlet member;

an outlet member in spaced relation to said inlet member and concentric therewith;

a plurality of box-like, open-ended body members serially interconnected and symmetrically disposed between said inlet and outlet members and defining therebetween a central chamber and a plurality of wing chambers communicating therewith, said wing chambers provided with openings having a total surface area sufficient to allow non-detonative escape of gaseous combustion products from ignition of powder to be contained therein, each of said body members including at least one wall member, normally closing said opening, and pressure responsive means for allowing said at least one wall member to open in response to a predetermined pressure increase in any of said chambers whereby said chambers and conveying member may be vented to the atmosphere.

2. The invention of claim 1, wherein said body members are prismatic in configuration, each comprising a pair of parallel, opposed side panels, a top panel and a bottom panel, said side panels being parallel to the longitudinal axis of said device, said top and bottom panels being inclined relative thereto, whereby to force vented gases, powders and flames away from said conduit to minimize structural damage and heating of powder within said conduit.

3. The invention of claim 2, wherein said body members are congruent and regularly spaced, whereby said device is subjected relatively balanced lateral pressures during operation to reduce structural damage.

4. The invention of claim 3, further comprising means for pivotably connecting each of said top panels to said inlet member and releasably retained in a closed position in contact with the corresponding bottom panel and side panels and means for reclosing said panels after opening thereof, whereby said device is reusable and not destroyed during operation.

5. The invention of claim 3, wherein the included angle between each of said bottom panels and said longitudinal axis is not greater than 75°.

6. The invention of claim 5, wherein said included angle is about 45°.

7. The invention of claim 2, wherein said inlet member projects into said central chamber, terminating below the plane defined by the lines of contact of corresponding ones of said top and bottom panels.

8. A safety device adopted to prevent detonation of readily flowable, detonatable material stored therein, said device comprising spaced, concentric inlet and outlet members, and a plurality of interconnected planar panels defining a symmetric, substantially cruciform chamber, the wings of said chamber each being defined by a pair of parallel side panels, a downwardly and outwardly oriented top panel and an upwardly outwardly oriented bottom panel, said top panel being openable in response to a predetermined pressure increase in said chamber, whereby said chamber is upwardly and outwardly vented to the atmosphere.

9. The invention of claim 7, wherein each of said top panels is hingedly connected to said inlet member and releasably retained in a closed position in contact with the corresponding bottom panel and side panels.

10. The invention of claim 8, wherein the included angle between each of said bottom panels and the longitudinal axis of said device is not greater than 75°.

11. The invention of claim 9, wherein said included angle is about 45°.

12. The invention of claim 8, wherein said inlet member projects into said chamber, terminating below the plane defined by the lines of contact of corresponding ones of said top and bottom panels.

13. The safety device of claim 1 wherein said openable wall members have a total openable area of at least about 0.75 square feet per hundred pounds of powder in said quantity of powder.

14. The safety device of claim 8 wherein said top panels have an openable area of at least about 0.75 square feet per hundred pounds of powder to be stored therein.

* * * * *